US010012350B2

(12) United States Patent
Le Bruchec et al.

(10) Patent No.: US 10,012,350 B2
(45) Date of Patent: Jul. 3, 2018

(54) METHOD AND SYSTEM FOR TREATING AND FEEDING NATURAL GAS TO AN APPARATUS FOR GENERATING POWER IN ORDER TO PROPEL A SHIP

(71) Applicant: GAZTRANSPORT ET TECHNIGAZ, Saint Remy les Chevreuse (FR)

(72) Inventors: Pierre Le Bruchec, Rambouillet (FR); Anaïs Denier-Guenegou, Bourg la Reine (FR); Loïc Guernec, Maurepas (FR); Laurent Spittael, Voisins le Bretonneux (FR); David Beauvais, Courbevoie (FR); Jérôme Huchet, Bourg la Reine (FR); Abdoulaye Diouf, Antony (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 287 days.

(21) Appl. No.: 14/783,724

(22) PCT Filed: Apr. 3, 2014

(86) PCT No.: PCT/FR2014/050804
§ 371 (c)(1),
(2) Date: Oct. 9, 2015

(87) PCT Pub. No.: WO2014/167219
PCT Pub. Date: Oct. 16, 2014

(65) Prior Publication Data
US 2016/0178128 A1 Jun. 23, 2016

(30) Foreign Application Priority Data
Apr. 11, 2013 (FR) ...................................... 13 53257

(51) Int. Cl.
F17C 9/02 (2006.01)
F02M 21/02 (2006.01)
(Continued)

(52) U.S. Cl.
CPC ........... *F17C 9/02* (2013.01); *F02M 21/0215* (2013.01); *F02M 21/06* (2013.01); *F17C 7/02* (2013.01);
(Continued)

(58) Field of Classification Search
CPC .. F17C 9/02; F17C 7/02; F17C 13/004; F17C 13/082; F17C 2265/03; F17C 2265/031; F17C 2203/03
See application file for complete search history.

(56) References Cited

U.S. PATENT DOCUMENTS 3,857,245 A * 12/1974 Jones ..................... F25J 1/0025
60/651
2007/0175226 A1 8/2007 Karlsson et al.
(Continued)

FOREIGN PATENT DOCUMENTS

DE 102007042158 3/2009
JP 2004099718 4/2004

*Primary Examiner* — Brian King
(74) *Attorney, Agent, or Firm* — Berenato & White, LLC

(57) ABSTRACT

The invention relates to a method for treating and feeding natural gas from a tank for storing liquefied gas storage to an apparatus for generating power, and to a burner of an apparatus for generating power in a ship, said method comprising the following consecutive steps:

supplying power to the apparatus for generating power, during which step natural gas is fed through a phase separator that returns a heavy fraction of the natural gas containing the hydrocarbons having the longest carbon chains to the tank as condensate and feeding a light fraction of the natural gas containing the hydrocarbons (Continued)

having the shortest carbon chains to the apparatus for generating power; and then recovering the heavy fraction of the natural gas, during which step natural gas is carried from the tank to the burner, bypassing said phase separator.

20 Claims, 7 Drawing Sheets

(51) Int. Cl.
*F02M 21/06* (2006.01)
*F17C 7/02* (2006.01)
*F17C 13/00* (2006.01)
*F17C 13/08* (2006.01)

(52) U.S. Cl.
CPC .......... *F17C 13/004* (2013.01); *F17C 13/082* (2013.01); *F17C 2203/03* (2013.01); *F17C 2221/033* (2013.01); *F17C 2223/0123* (2013.01); *F17C 2223/0161* (2013.01); *F17C 2223/033* (2013.01); *F17C 2223/047* (2013.01); *F17C 2225/0123* (2013.01); *F17C 2225/035* (2013.01); *F17C 2227/0135* (2013.01); *F17C 2227/0164* (2013.01); *F17C 2227/0302* (2013.01); *F17C 2227/039* (2013.01); *F17C 2250/036* (2013.01); *F17C 2250/0439* (2013.01); *F17C 2260/015* (2013.01); *F17C 2265/031* (2013.01); *F17C 2265/066* (2013.01); *F17C 2265/07* (2013.01); *F17C 2270/0105* (2013.01); *F17C 2270/0136* (2013.01); *Y02T 10/32* (2013.01)

(56) References Cited

U.S. PATENT DOCUMENTS

| | | |
|---|---|---|
| 2007/0199496 A1 | 8/2007 | Kackur |
| 2009/0126400 A1 | 5/2009 | Pozivil |
| 2009/0199909 A1 | 8/2009 | Spittael et al. |
| 2011/0185748 A1* | 8/2011 | Fuchs ...................... F17C 9/02 62/50.2 |

* cited by examiner

METHOD AND SYSTEM FOR TREATING AND FEEDING NATURAL GAS TO AN APPARATUS FOR GENERATING POWER IN ORDER TO PROPEL A SHIP

CROSS-REFERENCE TO RELATED APPLICATIONS AND CLAIM TO PRIORITY

This application is a national stage application of International Application No. PCT/FR2014/050804 filed Apr. 3, 2014, which claims priority to French Patent Application No. 1353257 filed Apr. 11, 2013, of which the disclosures are incorporated herein by reference and to which priority is claimed.

FIELD OF THE INVENTION

The invention relates to the field of ships propelled by natural gas.

The invention relates more particularly to a method and a system for treating natural gas and feeding same from a liquefied gas storage tank to an apparatus for generating power, such as a combustion engine.

BACKGROUND OF THE INVENTION

Ships comprising combustion engines that run on natural gas and propel these ships are known. In order to ensure correct operation of such combustion engines, the combustible natural gas needs to have certain properties. In particular, the methane number needs to be above a threshold, generally specified by the engine manufacturer, because gases with excessively low methane numbers do not burn correctly and cause engine knocking.

In order to guarantee that the natural gas fed to the engine has a methane number above a threshold, it is known for the engine supply circuit to be fitted with a phase separator that allows the heavy hydrocarbons of the natural gas to be returned to the storage tank in the form of condensate.

However, returning heavy hydrocarbons causes them to build up in the tank. Thus, as the level in the tank gets close to the bottom, a residue of heavy hydrocarbons remains that cannot be used for ship propulsion.

SUMMARY OF THE INVENTION

It is an aspect of the invention to provide a method and a system for treating natural gas and feeding it from a liquefied gas storage tank to an apparatus for generating power such as a combustion engine, for the propulsion of a ship, that provides a solution to the problems of concentration of heavy hydrocarbons at the bottom of the tank.

According to a preferred embodiment, the invention provides a method for treating and feeding natural gas in a ship from a liquefied gas storage tank to an apparatus for generating power, on the one hand, and to a burner of an installation for generating power, on the other hand, said method comprising consecutively:

a step of supplying the an apparatus for generating power, during which step natural gas is carried through a phase separator that returns a heavy fraction of the natural gas containing the hydrocarbons that have the longest carbon chains to the tank in the form of condensate and carries a light fraction of the natural gas containing the hydrocarbons that have the shortest carbon chains to the an apparatus for generating power; then a step of recovering the heavy fraction of the natural gas during which step natural gas is carried from the tank to the burner, bypassing said phase separator.

Therefore, by bypassing the phase separator, the heavy fraction of the natural gas can be eliminated and recovered to an installation for generating power fitted with a burner.

According to another embodiments, such a method may comprise one or more of the following features:

a method for monitoring a variable indicative of the methane number of the natural gas being fed during the step of supplying the apparatus for generating power.

a method for an automatic switchover to the step of recovering the heavy fraction of natural gas and/or the generation of an alarm signal when the variable indicative of the methane number of the natural gas being fed crosses a threshold.

a variable indicative of the methane number of the natural gas being fed may be determined by measuring the flow rate of the light fraction of the natural gas downstream of the phase separator and/or by measuring the temperature of the evaporated natural gas collected in the tank and/or by measuring the level and/or the purge frequency of a condensate collecting container.

According to another embodiment, the invention also provides a system carried onboard a ship for treating and feeding natural gas from a liquefied gas storage tank to an apparatus for generating power on the one hand, and to a burner of an installation for generating power on the other hand, the system comprising:

a first supply circuit feeding the an apparatus for generating power, said first circuit being fitted with a phase separator connected, downstream, on the one hand to a return conduit to return a heavy fraction of the natural gas containing the hydrocarbons that have the longest carbon chains to the tank in the form of a condensate and, on the other hand, to a supply conduit to feed the an apparatus for generating power a light fraction of the natural gas containing the hydrocarbons that have the shortest carbon chains, a second supply circuit, feeding the burner, said second circuit bypassing said phase separator.

According to another embodiments, such a system may comprise one or more of the following features:

a first circuit comprising, upstream of the phase separator, at least one circuit portion in common with the second circuit and designed to allow forced vaporization of the liquefied natural gas and/or to allow collection of the natural gas that has evaporated in the tank;

a circuit portion common to the first and to the second circuit comprising an intake pipeline opening toward the bottom of the tank, equipped with a pump and a forced vaporization installation allowing the liquefied natural gas to be converted into a stream of gas;

a circuit portion common to the first and to the second circuit comprising a pipeline opening into the top part of the tank to collect the natural gas that has evaporated in the tank;

a circuit portion common to the first and to the second circuit is limited downstream by a switchable three way connection member allowing the circuit portion in common to be connected selectively to an inlet of the phase separator or to a portion of the second circuit leading to the burner;

a second circuit for feeding the burner fitted with a gas heating appliance;

a first circuit for supplying natural gas to the an apparatus for generating power comprising a compressor positioned downstream of the phase separator;

a system comprising a device for monitoring a variable indicative of the methane number of the liquefied natural gas being carried;

a device for monitoring a variable indicative of the methane number of the liquefied natural gas being carried comprising a sensor for measuring the flow rate in the carrying pipe leading toward the an apparatus for generating power and/or a sensor for measuring the temperature of evaporated natural gas collected in the tank and/or a sensor for measuring the level in a condensate collecting container and/or a counter for measuring the purge frequency of a condensate collection container;

a monitoring device designed to generate an alarm signal and/or to activate a switchable three-way connection member so as to lead the natural gas toward the burner when the variable indicative of the methane number of the liquefied natural gas being carried crosses a threshold.

According to another embodiment, the invention also provides a ship comprising a liquefied gas storage tank, an apparatus for generating power, an installation for generating power equipped with a burner and a system for treating and feeding the natural gas of the above aforementioned type.

According to another embodiment, such a ship may comprise one or more of the following features:

an apparatus for generating power intended for the propulsion of the ship;

an apparatus for generating power that is a dual fuel diesel/natural gas combustion engine;

a liquefied gas storage tank wherein the tank has a membrane;

a tank wherein the tank is a storage tank at atmospheric pressure.

According to another embodiment, the invention also relates to a method for filling the tank of a ship as mentioned hereinabove, in which method a fluid is fed through insulated pipelines from a floating or on shore storage facility toward the tank of the ship.

According to another embodiment, the invention also relates to a system comprising a ship as mentioned hereinabove, insulated pipelines arranged in such a way as to connect the tank installed in the hull of the ship to a floating or on shore storage facility and a pump for driving a stream of fluid through the insulated pipelines from the floating or on shore storage facility to the tank of the ship.

BRIEF DESCRIPTION OF THE DRAWINGS

The invention will be better understood, and further objects, details, features and advantages thereof will become more clearly apparent during the course of the following description of a number of particular embodiments of the invention which are given solely by way of non-limiting illustration, with reference to the attached drawings.

DETAILED DESCRIPTION OF THE PREFERRED EMBODIMENTS

In the description and the claims, the terms "upstream" and "downstream" are defined with reference to the direction in which the natural gas circulates.

Figure 7:
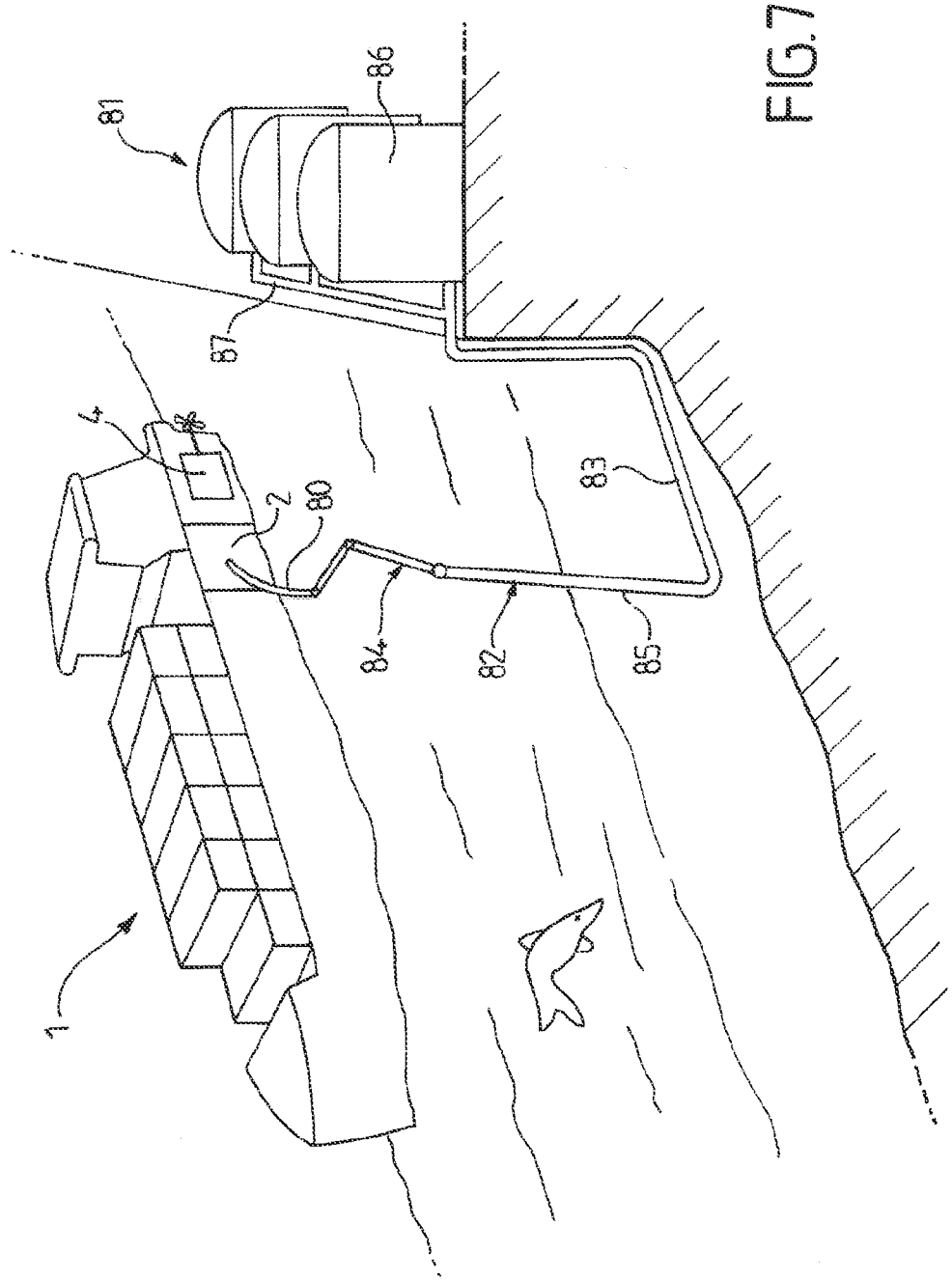
FIG. 7 illustrates a ship equipped with a gas storage tank and with an apparatus for generating power supplied with natural gas for the propulsion of the ship.

FIG. 7 depicts a ship 1 equipped with one or more liquefied natural gas storage tanks 2 and with a propulsion unit comprising one or more an apparatus for generating power items 4 chosen from combustion engines, fuel cells or gas turbines, supplied with natural gas. Such a ship 1 may notably be a methane tanker intended for transporting liquefied natural gas, but may also be intended for any other applications. By way of example, it may be a merchant ship, a passenger ship, a fishing boat, or the like.

Figure 1:
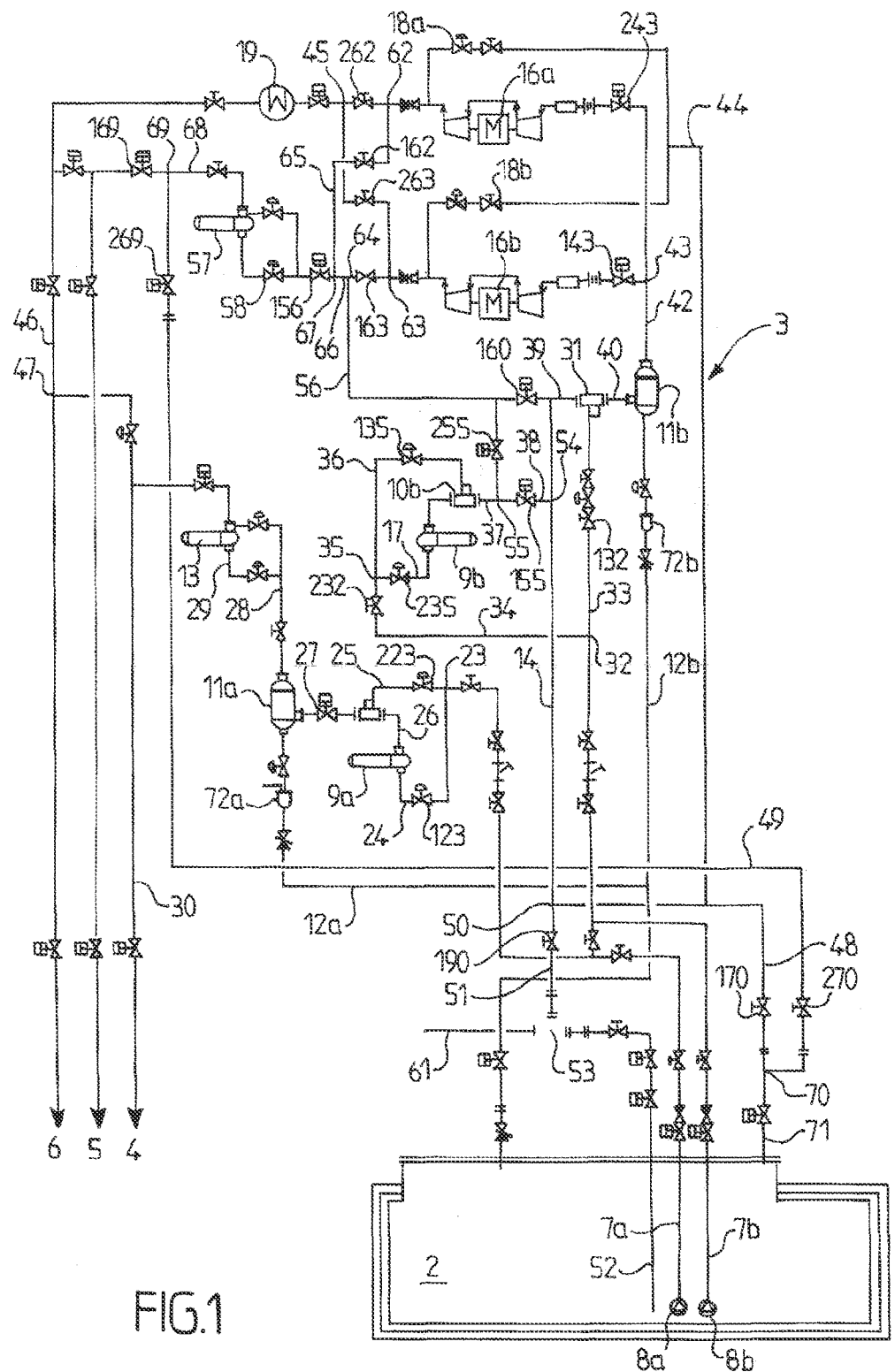
FIG. 1 is a schematic view of a natural gas treatment and feeding system onboard a ship.
Figure 2:
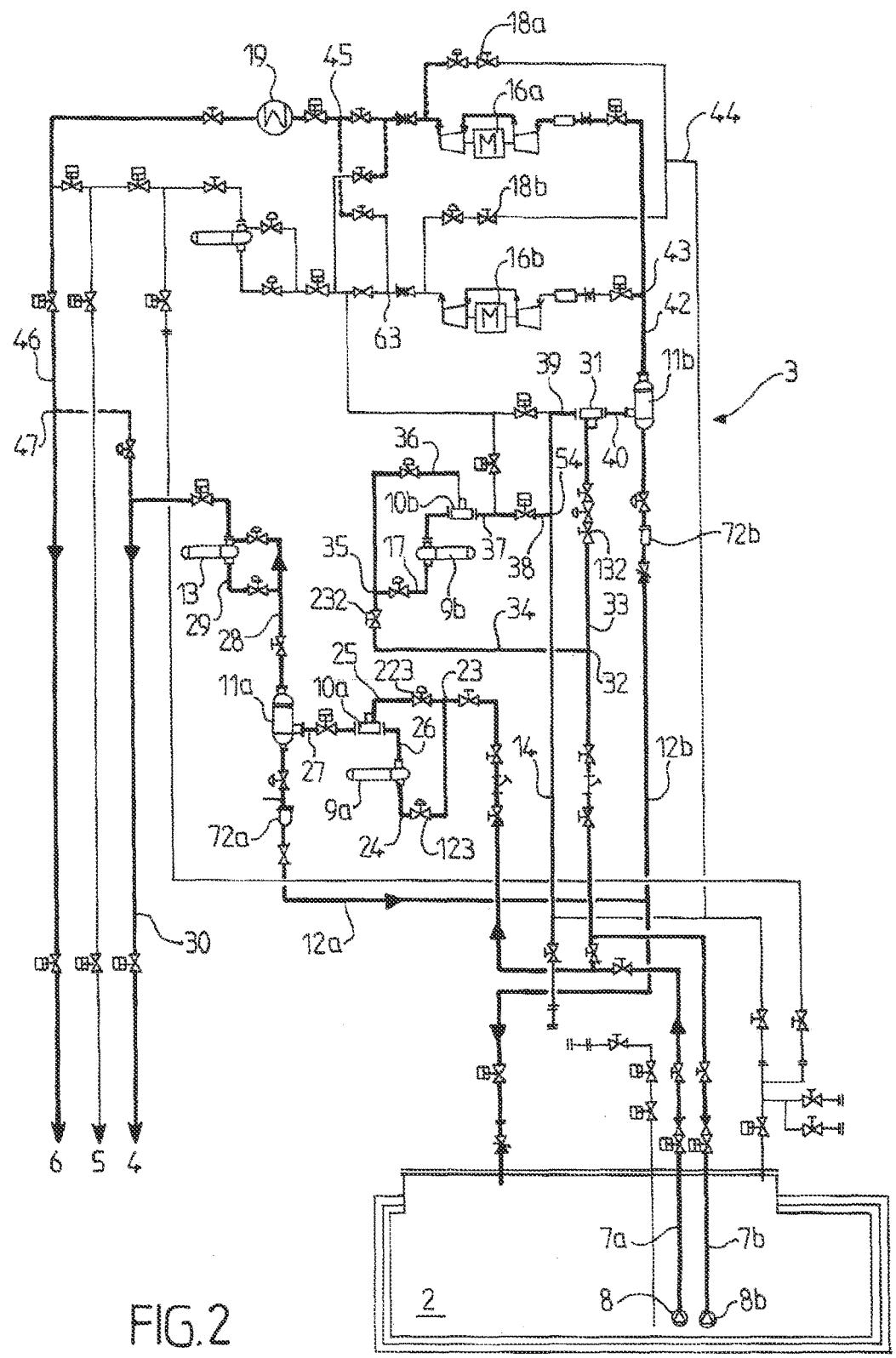
FIG. 2 illustrates the system of FIG. 1, in which a path of the natural gas for supplying an apparatus for generating power for propelling the ship and for supplying an apparatus for generating power for generating electricity has been highlighted.
Figure 3:
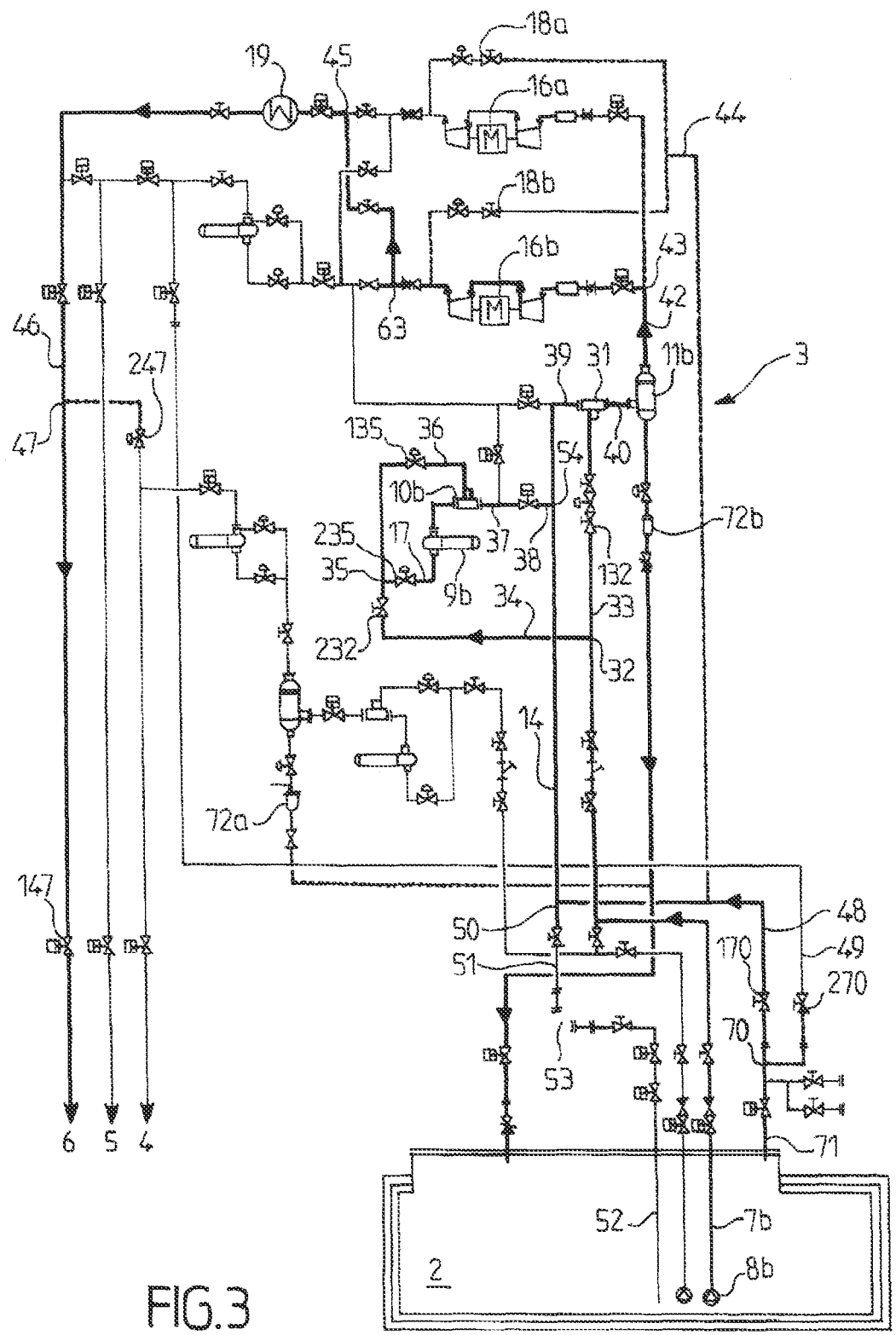
FIG. 3 illustrates the system of FIG. 1, in which a path of the natural gas for supplying an apparatus for generating power for generating electricity has been highlighted.
Figure 4:
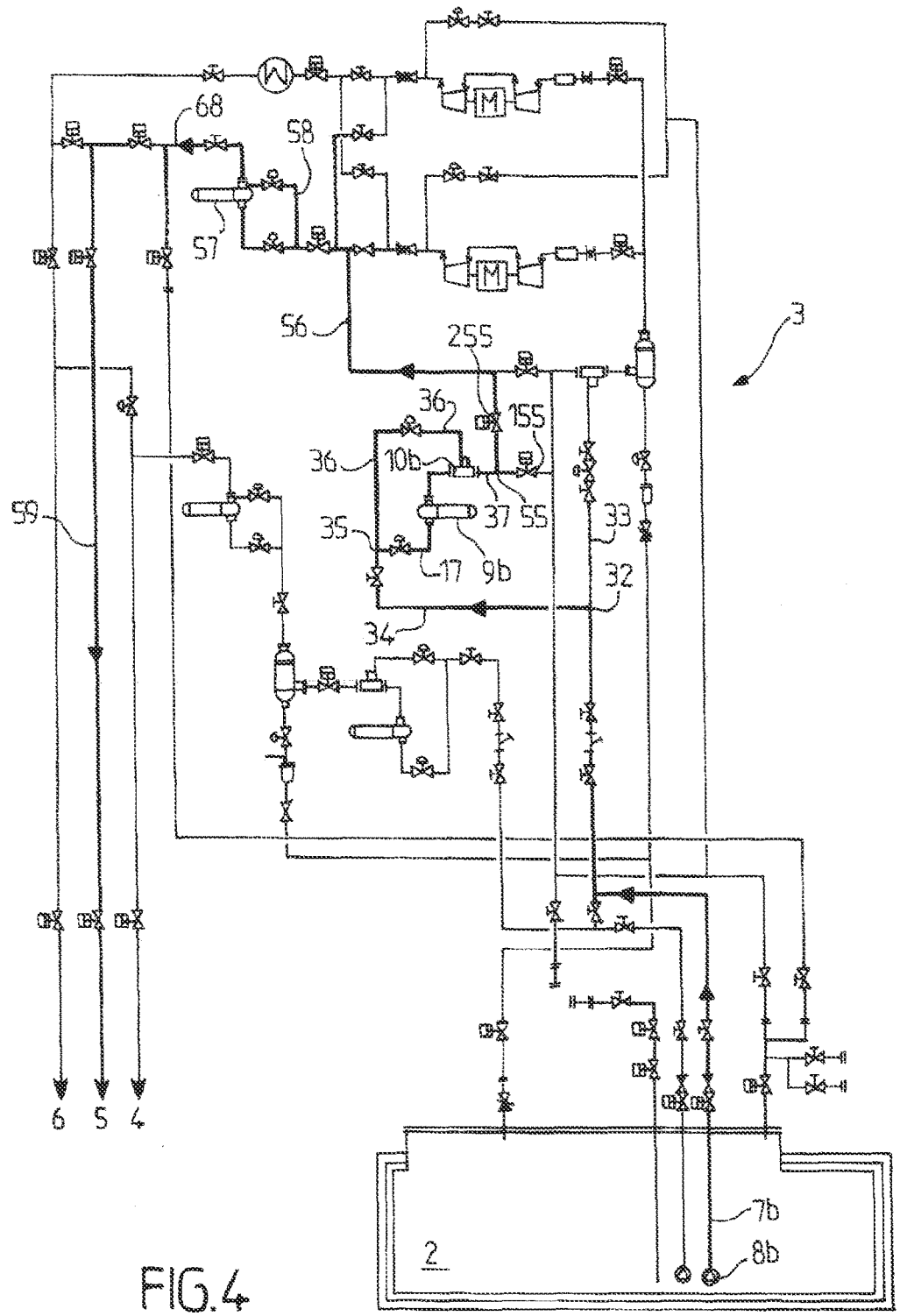
FIG. 4 illustrates the system of FIG. 1, in which a path of the natural gas to a burner of an energy production facility for recovering and making use of the heavy fraction of the natural gas has been highlighted.
Figure 5:
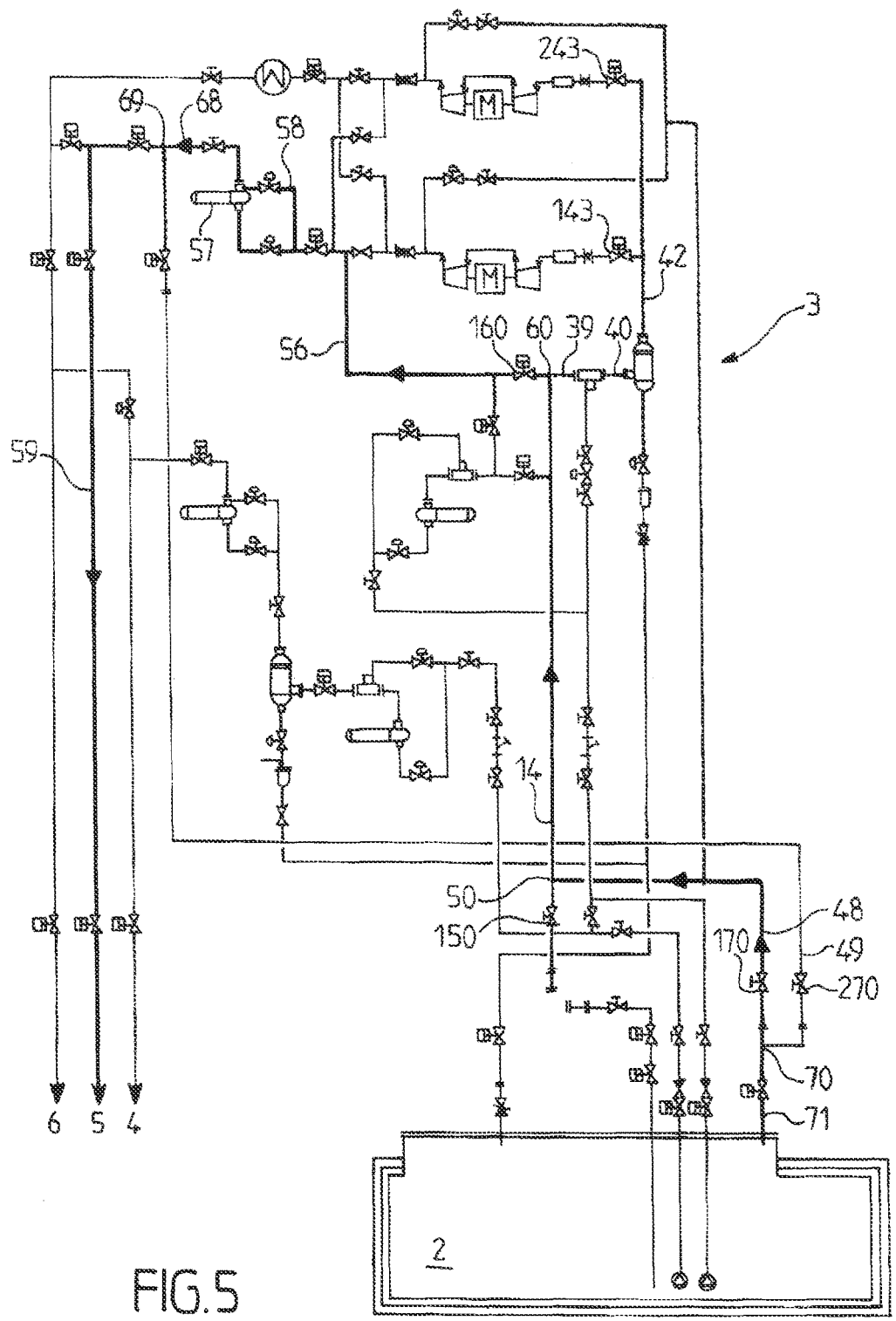
FIG. 5 illustrates the system of FIG. 1, in which a path of the natural gas, evaporated in the tank, to the burner of the energy production facility has been highlighted.
Figure 6:
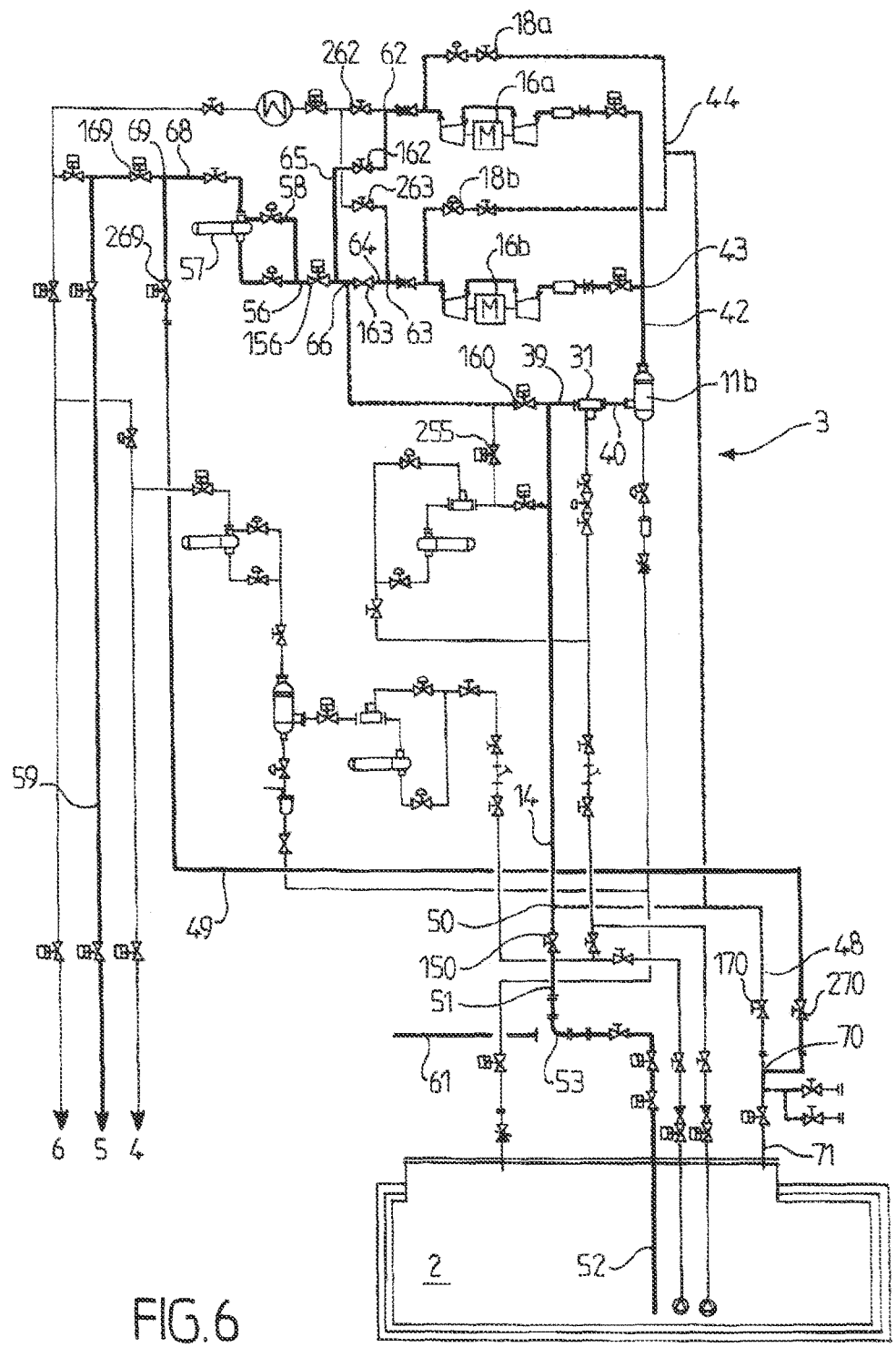
FIG. 6 illustrates the system of FIG. 1, in which a path of the natural gas during implementation of a tank heating method has been highlighted.

FIG. 1 depicts a natural gas storage tank 2 and a system 3, carried on board the ship 1, for treating and feeding the natural gas. The natural gas treatment and feeding system 3 is suited to supplying an apparatus for generating power 4 of the propulsion unit, as depicted in FIG. 2, to feeding a burner 5, as depicted in FIGS. 4, 5 and 6 and, as an option, to feeding further an apparatus for generating power such as a combustion engine, a fuel cell or a gas turbine 6 of an electric generator, as depicted in FIGS. 2 and 3.

The tank 2 is a sealed and thermally insulated tank suited for the storage of liquefied natural gas (LNG). The tank 2 may notably be of the type having membranes allowing liquefied natural gas to be stored at atmospheric pressure.

The apparatus for generating power 4 of the propulsion unit is chosen from combustion engines, fuel cells and gas turbines. When the apparatus for generating power 4 is a combustion engine, the engine may be a hybrid engine running on diesel/natural gas. Such engines 4 can operate either in diesel mode, whereby the engine is fed wholly with diesel, or in natural gas mode whereby the fuel for the engine consists mainly of natural gas while a small pilot quantity of diesel is injected in order to initiate combustion.

The output shaft associated with the mechanical energy generated by the an apparatus for generating power 4 of the propulsion unit may either be coupled to one or more propellers for the propulsion of the ship or be coupled to an alternator to allow the mechanical energy to be converted into electrical energy, the electrical energy in that case being used to power an electric motor coupled to a propeller for the propulsion of the ship. In the latter alternative, if a combustion engine is used, it may notably be an engine of the DFDE type, which stands for Dual Fuel Diesel Electric in English.

The an apparatus for generating power 6 for generating electricity may be a diesel/natural gas dual fuel combustion engine, for example of the DFDE type, a fuel cell or a gas turbine.

The burner 5 is incorporated into an installation for generating power. The installation for generating power may notably comprise a boiler for producing steam. The steam may be intended to feed steam turbines for the production of energy and/or to feed a heating network of the ship 1.

FIG. 2 illustrates two circuits respectively feeding the apparatus for generating power 4 of the propulsion unit and the apparatus for generating power 6 for the generation of electricity. The circuit feeding the an apparatus for generating power 4 of the propulsion unit will hereinafter be referred to as the "main circuit" whereas the circuit feeding the an apparatus for generating power 6 for producing electricity will be referred to as the "secondary circuit". Note that the main circuit may also be used for feeding the natural gas to the secondary circuit or vice-versa. Such an arrangement provides redundancy of the supply of the apparatus for generating power 4, 6, thereby guarding against potential malfunctions.

The main circuit comprises an intake pipeline 7a opening toward the bottom of the tank 2 and fed by a pump 8a. The intake pipeline 7a carries the liquefied natural gas to a switchable three-way connection 23 that allows the intake pipeline 7a to be connected, on the one hand, to a pipeline 24, equipped with a valve 123, connected to the inlet of a forced vaporization installation 9a also referred to as an evaporator and, on the other hand, to a pipeline 25 equipped with a valve 223, connected to an atomizer 10a. The forced vaporization installation 9a allows the liquefied natural gas to be converted into a stream of gas. The outlet of the forced vaporization installation 9a is connected by a pipe 26 to the atomizer 10a so as to carry the stream of gas toward said atomizer 10a. The atomizer 10a is able to spray, into the stream of gas obtained at the outlet of the forced vaporization installation 9a, liquefied natural gas that is collected upstream of said forced vaporization installation 9a. The atomizer 10a thus allows the stream of gas to be cooled so that the heaviest hydrocarbons, that is, those having the longest carbon chains and the highest evaporation temperatures, condense. The stream of gas is typically cooled to a temperature of below −100° C.

On leaving the atomizer 10a, the stream of gas laden with droplets of natural gas in suspension is carried to a phase separator 11a via the pipeline 27. This phase separator 11a, sometimes referred to as a mist separator, allows the liquid phase to be separated from the gaseous phase. The liquid phase consists of a heavy fraction of the natural gas containing the heaviest hydrocarbons, that is, those having the longest carbon chains. The heavy fraction of the natural gas is sent in the form of condensate to the storage tank 2 via a condensate return pipeline 12a. The condensate return pipeline 12a is equipped with a condensate collection container 72a that is regularly purged when the level of condensate therein reaches a threshold.

The gaseous phase consisting of the light fraction of the natural gas containing the hydrocarbons that have the shortest carbon chains is itself carried, via the pipeline 28, to a gas heating appliance 13 that allows the gaseous phase to be heated to a typical temperature of 30° C. Such a gas heating appliance 13 is typically a gas/liquid or gas/gas heat exchanger. The gas heating appliance 13 here is equipped with a recirculation loop 29.

Finally, at the outlet of the gas heating appliance 13a, the stream of gas can be carried toward the apparatus for generating power 4 of the propulsion unit via the pipeline 30.

Similarly, the secondary circuit comprises an intake pipeline 7b opening toward the bottom of the tank 2 and fed by a pump 8b. The intake pipeline 7b allows the liquefied natural gas to be carried to a forced vaporization installation 9b and to two atomizers 10b and 31. To do that, the intake pipeline 7b is connected via a switchable three-way connection 32, on the one hand, to a pipeline 33 equipped with a valve 132 leading to an atomizer 31 and, on the other hand, to a pipeline 34 equipped with a valve 232 and itself connected to a switchable three-way connection 35 allowing said pipeline 34 to be connected, on the one hand, to the atomizer 10b via the pipeline 36 equipped with a valve 135 and, on the other hand, to the inlet of the forced vaporization installation 9b via the pipeline 17 equipped with a valve 235.

The outlet of the forced vaporization installation 9b is connected by a series of pipelines 37, 38, 39 to the atomizers 10a, 31 allowing liquefied natural gas to be sprayed so as to condense the heaviest hydrocarbons. The stream of gas leaving the atomizer 31 is carried to the inlet of a phase separator 11b via a pipeline 40.

Similarly, the phase separator 11b allows the liquid phase to be separated from the gaseous phase and allows the condensate to be returned to the tank 2 via a condensate return pipeline 12b. The condensate return pipeline 12b is equipped with a container 72b for collecting the condensate which is regularly purged when the condensate level therein reaches a threshold.

On the other hand, at the outlet from the phase separator 11b, the gaseous phase, consisting of the light fraction of the natural gas, is carried, via a pipeline 42, to one or more compressors 16a, 16b arranged in parallel. In order to allow the stream of gas to be fed in parallel to a number of compressors 16a, 16b, the pipeline 42 is provided with one or more multi-way connections 43 leading to pipelines equipped with valves 143, 243. In FIG. 2, the stream of gas is fed only through one of the two compressors 16a, 16b. However, depending on the reference flow rate for supplying the apparatus for generating power 4 or 6, it may be envisioned for the stream of gas to be passed in parallel through both compressors 16a, 16b.

For example, the compressors 16a, 16b are multi-stage compressors allowing the stream of gas to be heated and compressed to pressures compatible with the specifications of the an apparatus for generating power 6 fed with natural gas, for example of the order of 5 to 6 bar absolute in the case of combustion engines of the DFDE type. The compressor 16a, 16b may be a positive-displacement compressor, a centrifugal compressor or any other type of compressor compatible with the supply pressures on the inlet side of a combustion engine, a fuel cell or a gas turbine.

Advantageously, the system 3 is equipped with an anti-instability or anti-surge protection device for protecting the compressor 16a, 16b against speeds with low volume flow rate on the inlet side. Such a device comprises, on the outlet side of the compressor 16a, 16b, a recirculation loop 44 that allows part of the compressed stream of gas to be returned upstream of said compressor 16. The recirculation loop 44 is equipped with a valve 18a, 18b allowing control of the flow rate in the recirculation loop 44. In the embodiment depicted, the recirculation loop 44 is connected to a pipeline 14, the arrangement of which is described hereinafter.

On exiting the compressor(s) 16a, 16b, the stream of gas is fed to a cooling apparatus 19 that allows the temperature of the stream of gas to be brought to a reference temperature. When the system comprises several compressors 16a, 16b in parallel, the outlets of said compressors 16a, 16b are connected to the inlet of the cooling apparatus 19 via switchable three-way connections 45, 63.

Finally, on leaving the cooling apparatus 19, the stream of gas is carried to the apparatus for generating power 6 of the electric generator via a pipeline 46. Note that said pipeline 46 is equipped with a switchable three-way connection 47, the two outlet paths of which are equipped with valves 147, 247 allowing the stream of gas to be directed selectively toward the an apparatus for generating power 6 of the electric generator and/or toward the an apparatus for generating power 4 of the propulsion unit.

Note also that, in the embodiment depicted, the main circuit, that supplies the an apparatus for generating power 4, is not equipped with a compressor, unlike the secondary circuit, because the main circuit and the pump 8a feeding the intake pipeline 7a of the main circuit are capable of supplying pressures consistent with the conditions of operation of said an apparatus for generating power 4.

FIG. 3 depicts the feeding of the gas through the secondary circuit when natural gas evaporated in the storage tank is incorporated into the secondary supply circuit feeding the an apparatus for generating power 6.

To do this, the system 3 comprises a pipeline 71 opening into the top part of the tank 2. A switchable three-way connection 70 connects the pipeline 71 opening into the top part of the tank 2 to the secondary circuit via a pipeline 48 fitted with a valve 170 and to a pipeline 49, equipped with a valve 270 and forming part of a heating circuit the purpose of which is detailed hereinafter. The switchable three-way connection 70 and the valves 170, 270 form a switchable three-way connection member.

The pipeline 48 is moreover connected via a switchable three-way connection 50 to a pipeline 14. The switchable three-way connection 50 connects the pipeline 14 to a pipeline 51 equipped with a valve 150 and forming part of the heating circuit and to the pipeline 48 equipped with the valve 170. The switchable three-way connection 50 and the valves 150 and 170 also form a switchable connection member.

The pipeline 14 is connected to the secondary circuit via a switchable three-way connection 54 that allows the outlet of the atomizer 10b and said pipeline 14 to be connected to the inlet of the atomizer 31. The gas evaporated in the tank 2 is thus incorporated into the stream of gas leaving the forced vaporization installation 9b before being carried to the second atomizer 31, but also has the function of controlling the temperature of the stream of gas entering the phase separator 11b by spraying natural gas in the liquefied state into the stream of gas. Thus, the secondary supply circuit comprises, in the upstream portion thereof, a path for feeding evaporated natural gas, collected in the tank 2, and a path for forced vaporization of natural gas.

Such a path for feeding gas evaporated in the tank is particularly appropriate when the liquefied natural gas is stored at ambient temperature resulting in considerable natural evaporation.

FIGS. 4 and 5 illustrate the path for supplying the burner 5 with natural gas. FIG. 4 illustrates the path of forced vaporization of natural gas while FIG. 5 illustrates the path of the evaporated natural gas collected in the tank 2. It will be noted that, in both cases, the circuit for supplying the burner 5 bypasses the phase separator 11b so as to allow the energy contained in the heavy fraction of the natural gas to be recovered.

In FIG. 4, the supply circuit feeding the burner 5 comprises a circuit portion that is common with the secondary circuit. This circuit portion in common allows the forced vaporization of the liquefied natural gas and comprises the intake pipeline 7b fed by the pump 8b, the forced vaporization installation 9b and, optionally, the atomizer 10b.

Downstream of the forced vaporization installation 9b, the treatment and feeding system 3 comprises a switchable three-way connection 55 connecting the outlet of the forced vaporization installation 9b to the series of pipelines 38, 39, 40 which are equipped with a valve 155 and lead to the phase separator 11b, and a pipeline 56, equipped with a valve 255, allowing said phase separator 11b to be bypassed so that the heavy fraction of the natural gas can be recovered and used in the burner 5. Thus, the switchable connection member thus formed allows the outlet from the forced vaporization installation 9b to be fed selectively either toward the phase separator 11b or toward the burner 5.

The pipeline 56 carries the stream of gas leaving the forced vaporization installation toward a gas heating appliance 57. The gas heating appliance 57 is, for example, a gas/liquid or gas/gas heat exchanger. The gas heating appliance 57 here is equipped with a recirculation loop 58. The gas heating appliance 57 allows the gaseous phase to be heated, upstream of said burner 5, to a reference temperature typically of the order of 30° C. At the outlet from the gas heating appliance 57, pipelines 68, 59 carry the gas toward the burner 5.

In FIG. 5, the supply circuit feeding the burner 5 comprises another circuit portion in common with the secondary circuit. This circuit portion in common allows the natural gas evaporated in the tank 2 to be collected. This circuit portion in common comprises the pipeline 71 opening into the top part of the tank 2, the pipeline 48 connected to the pipeline 71 by the switchable three-way connection 70 and the pipeline 14 connected to the pipeline 71 by the switchable three-way connection 50. The pipeline 14 is moreover connected to a switchable three-way connection 60 connecting the pipeline 14 to the series of pipelines 39, 40 leading toward the phase separator 11b and toward the valves 143, 243 and to a pipeline 56, equipped with a valve 160, and allowing said phase separator 11b to be bypassed so that the heavy fraction of the natural gas can be recovered and used in the burner 5.

Later, as detailed hereinabove in conjunction with FIG. 4, the pipeline 56 carries the stream of gas toward the gas heating appliance 57 then, at the outlet of the gas heating appliance 57, pipelines 68, 59 carry the gas toward the burner 5.

Note that, while the path of the natural gas evaporated in the tank 2 and the path of the forced vaporization of the natural gas are illustrated in two different figures for the sake of ease of understanding, it is entirely possible to use these two paths simultaneously for carrying natural gas to the burner 5.

The natural gas treatment and feeding system 3 is advantageously equipped with a device for monitoring a variable indicative of the methane number of the liquefied natural gas being fed. The methane number indicates the ability of the gaseous mixture to withstand the undesirable phenomenon of engine knocking and is comprised between 0 and 100. The methane number is dependent on the composition of the natural gas. The methane number for pure methane is 100. The number decreases as the proportion of heavier hydrocarbons such as propane, butane and/or pentane increases.

Such a device for monitoring a variable indicative of the methane number of the natural gas may notably comprise one or more flow meters arranged downstream of one or both phase separators 11a, 11b, in the pipeline 42 for example, so as to measure the flow rate of the stream of gas of the light fraction of the natural gas. This flow rate is indicative of the methane number of the liquefied natural gas being fed. This is because under steady state conditions, at a constant pumping flow rate, this flow rate will have a tendency to decrease as the tank 2 empties and as the concentration in heavy hydrocarbons increases.

Alternatively or in addition, it is equally possible to place a temperature sensor for example in the pipeline 48 for feeding the evaporated gas collected in the tank 2, so as to measure the temperature of the evaporated gas. This is because the higher the temperature of the evaporated gas is, the higher the proportion of heavy hydrocarbons the tank contains, because it is getting close to the end of the trip.

Furthermore, as an alternative or in addition, it is equally possible to log the purge frequency of at least one of the condensate collection containers 72a, 72b and/or to monitor how the condensate level of at least one of the containers 72a, 7b evolves.

The monitoring device also comprises a control unit able to receive and process the data collected by at least one of the sensors mentioned herein below. The control unit compares the variable(s) indicative of the methane number against a threshold. On the basis of this comparison, the control unit is able to generate an alarm or to switch automatically from a mode of operation in which natural gas is fed to the an apparatus for generating power 4, 6 of the propulsion unit and/or of the electric generator to a mode of operation in which the heavy fraction of the natural gas is recovered and carried to the burner 5 of the installation for generating power. In practice, when the variable indicative of the methane number corresponds to a methane number lower than a number of around 80, the control unit generates an alarm or switches automatically into the mode in which the heavy fraction of the natural gas is recovered and used.

In the embodiment that foresees such an automatic changeover in mode of operation, the monitoring device is able to transmit a reference signal to one or more valves 155, 255, 160, 143, 243 with which the switchable three-way connections 55 and 60 are equipped, so as to switch the stream of gas toward the burner 5, bypassing said phase separator 11b.

When the an apparatus for generating power is a gas/diesel dual fuel combustion engine, in parallel with the switch to a mode of operation in which the heavy fraction of the natural gas is recovered and carried to the burner 5, the combustion engine or the fuel cell or the gas turbine 4 of the propulsion unit and/or that of the electric generator 6 switches over to diesel mode in order to continue the propulsion of the ship and/or the generation of electricity.

FIG. 6 illustrates the path of the natural gas when a method that allows the heating of the tank 2 is implemented. This method is implemented when the tank 2 is almost empty, the residual natural gas then being in gaseous form in the tank 2.

During implementation of the heating method, the natural gas is collected in the bottom part of the tank 2 using a pipeline 52 that opens into the bottom part of the tank 2.

In the embodiment depicted, the pipeline 52 opening into the bottom part of the tank 2 is connected to a switchable three-way connection member 53 that allows said pipeline 52 to be connected selectively either to a pipeline 51 of the upstream portion of the heating circuit so as to allow a stream of gas to be collected in the bottom part of the tank 2 or to a filling circuit 61 for filling the tank 2, allowing liquefied natural gas to be fed from an on-shore reservoir to the tank 2.

Moreover, the pipeline 51 of the upstream portion of the heating circuit is connected, downstream, to a switchable three-way connection 50. The valves 170, 150 allow selective connection of either the pipeline 51 of the upstream portion of the heating circuit, or the pipeline 48 allowing the feeding of the evaporated gas, collected in the tank 2, to the pipeline 14.

The upstream portion of the heating circuit may thus be connected to the inlet of the compressors 16a, 16b by the pipelines 39, 40 and 42 so as to carry the gas collected at the bottom part of the tank to the compressors. The temperature of the stream of gas leaving the compressors 16a, 16b for implementing the method of heating the tank 2 is, for example, of the order of 50° C.

The circuit portion comprising the pipelines 14, 39, 40 and 42 and at least one of the compressors 16a, 16b is thus common to the secondary circuit that supplies gas to an apparatus for generating power 4, 6 and to the heating circuit. As a result, the design of the system 3 for treating and feeding the gases is optimized and at least one of the compressors 16a, 16b both prepares a stream of gas for supplying an apparatus for generating power 4, 6 and is involved in implementing a method of heating the tank 2.

At the outlet from the compressors 16a, 16b, three-way connections 62, 63 connect the outlet of the compressors 16a, 16b to pipelines 64, 65 equipped with valves 162, 163 and to pipelines opening toward the secondary supply circuit and equipped with valves 262, 263. Said pipelines 64, 65 are connected via switchable three-way connections 66, 67 to the pipeline 56 that forms part of the supply circuit feeding the burner 5 leading to the gas heating appliance 57.

Thus, to heat the tank 2, the stream of gas passes both through the compressors 16a, 16b and through the heating appliance 57. On leaving the gas heating appliance 57, the stream of gas has, for example, a temperature of the order of 80° C.

Moreover, on leaving the gas heating appliance 57, a pipeline 68 leads to a switchable three-way connection 69 that allows an excess part of the stream to be removed to the burner 5 via the pipeline 59 equipped with a valve 169 and allows the other part of the stream of gas to be returned to the tank 2 via a pipeline 49 equipped with a valve 269 and forming a return section leading to the tank 2.

It will thus be appreciated that the pipeline 56, the gas heating appliance 57 and the pipeline 68 define a circuit portion which is common to the heating circuit for heating the tank 2 and to the supply circuit feeding the burner 5 with gas. As a result, the pipelines 64, 65 form connection sections that allow the outlet of the compressors 16a, 16b to be connected to the circuit portion that is common to the tank 2 heating circuit and to the supply circuit feeding the burner 5 with gas.

The pipeline 49 that forms a return section leading to the tank 2 is connected, via the switchable three-way connection 70, to the pipeline 71 opening into the top part of the tank 2. Thus, depending on the position of the valves 170, 270, the pipeline 71 opening into the top part of the tank 2 can be used for collecting the gas evaporated in the tank 2 when there is a desire to supply an apparatus for generating power 4, 6 or the burner 5, with natural gas, or for injecting hot gas where there is a desire to heat the tank 2.

As a result, during implementation of the method for heating the tank 2, hot gas is injected into the top part of the tank 2 while the gas is extracted from the bottom part of the tank 2. As the hot gas by nature has a tendency to rise to the top of the tank 2, such an arrangement makes it possible to obtain thermal stratification of the tank 2 thereby increasing the efficiency of the method of heating the tank 2.

In a known way, as depicted in FIG. 7, loading/offloading pipelines may be connected, by means of suitable connectors, to a maritime or harbor terminal for transporting a cargo of LNG from or to the tank 2.

FIG. 7 depicts one example of a maritime terminal comprising a liquefied natural gas supply station 82, an underwater pipe 83 and an on-shore installation 81. The liquefied natural gas supply station 82 is a fixed off-shore installation comprising a mobile arm 84 and a tower 85 supporting the mobile arm 84. The mobile arm 84 supports insulated flexible hoses 80 that can be connected to the loading pipelines. The orientable mobile arm 84 adapts to all sizes of ships. A connecting pipe, not depicted, extends up inside the tower 85. The liquefied natural gas supply station 82 allows the tank of the ship 1 to be filled from the on-shore facility 81. The latter comprises liquefied gas storage tanks 86 and connecting pipes 87 connected by the underwater pipe 83 to the liquefied natural gas supply station 82. The underwater pipe 83 allows the liquefied gas to be transferred between the liquefied natural gas supply station 82 and the on-shore facility 81.

In order to generate the pressure needed for transferring the liquefied gas, use is made of the pumps onboard the ship 1 and/or the pumps with which the on-shore facility 81 is equipped and/or the pumps with which the loading and offloading station 82 is equipped.

Although the invention has been described in conjunction with a number of particular embodiments it is quite obvious that it is not in any way restricted thereto and that it comprises all technical equivalents of the means described and combinations thereof where these fall within the scope of the invention.

In particular, although in the embodiments described hereinabove the ship comprises just one liquefied natural gas storage tank, it is equally possible for the gas treatment and feeding system to be connected to a plurality of storage tanks. In that case, the storage tanks are each equipped with intake pipelines fed by pumps and with pipelines opening into the top and the bottom of the tank, these being connected to the treatment system circuits as described hereinabove.

It will moreover be noted that while the term connection member has been used hereinabove to describe the combination of a switchable three-way connection with several valves equipping one or more incoming pipelines or one or more outgoing pipelines, this term extends to all technical equivalents that allow two incoming pipelines to be connected to an outgoing pipeline or one incoming pipeline to be connected to two outgoing pipelines, and which are equipped with means which, according to the circumstances, allow a selection to be made in order to promote either a stream from one of the two incoming pipelines or a stream toward one of the two outgoing pipelines or allow either an incoming stream to be split between two outgoing streams or two incoming streams to be combined into one outgoing stream.

The use of the verbs "comprise", "have" or "include" and the conjugated forms thereof does not exclude there being other elements or other steps present than those listed in a claim. The use of the indefinite article "a" or "an" for an element or a step does not, unless mentioned otherwise, exclude there being a plurality of such elements or steps.

In the claims, any reference sign between parentheses must not be interpreted as implying a limitation on the claim.

The invention claimed is:

1. A method for treating and feeding natural gas, in a ship, from a liquefied gas storage tank to an apparatus for generating power and to a burner of an installation for generating power, said method comprising the steps of:
    supplying the apparatus for generating power with natural gas, during which step a first stream of natural gas is carried through a phase separator that separates the first stream of natural gas into a heavy fraction and a light fraction, each fraction containing hydrocarbons that have carbon chains; the carbon chains of the heavy fraction being longer than the carbon chains of the light fraction; the step of supplying the apparatus for generating power further comprising the step of returning the heavy fraction to the tank in the form of condensate and feeding the light fraction to the apparatus for generating power; then
    recovering the heavy fraction during which step a second stream of natural gas is fed from the tank to the burner, bypassing the phase separator.

2. The method as claimed in claim 1, wherein the step of supplying the apparatus for generating power further comprises the step of monitoring a variable indicative of the methane number of the first stream of natural gas.

3. The method as claimed in claim 2, wherein the step of monitoring the variable indicative of the methane number of the first stream of natural gas comprises at least one of an automatic switchover and an alarm that signals when the variable indicative of the methane number of the first stream of natural gas reaches a threshold.

4. The method as claimed in claim 2, wherein the variable indicative of the methane number of the first stream of natural gas is determined by measuring at least one of a flow rate of the light fraction downstream of the phase separator, a temperature of evaporated natural gas collected in the tank, a level in a condensate collecting container, and a purge frequency of the condensate collecting container.

5. A system carried onboard a ship, for treating and feeding natural gas from a liquefied gas storage tank to an apparatus for generating power, and to a burner of an installation for generating power, the system comprising:
    a first supply circuit feeding the apparatus for generating power, said first circuit comprising a phase separator arranged to separate a first stream of natural gas into a heavy fraction and a light fraction, each fraction containing hydrocarbons that have carbon chains, the carbon chains of the heavy fraction being longer than the carbon chains of the light fraction; the phase separator connected, downstream to a return conduit allowing the heavy fraction to be returned to the tank in the form of condensate and, to a supply conduit feeding the light fraction to the apparatus for generating power
    a second supply circuit feeding the burner arranged to feed a second stream of natural gas from the tank to the burner, the second circuit bypassing the phase separator.

6. The system as claimed in claim 5, wherein the first circuit comprises, upstream of the phase separator, at least one portion in common with the second circuit and designed to allow at least one of forced vaporization of liquefied natural gas and collection of natural gas that has evaporated in the tank.

7. The system as claimed in claim 6, wherein the circuit portion common to the first and to the second circuit comprises an intake pipeline opening toward a bottom of the tank, equipped with a pump and a forced vaporization apparatus allowing liquefied natural gas to be converted into the first or second stream of gas.

8. The system as claimed in claim 6, wherein the circuit portion common to the first and to the second circuit comprises a pipeline opening into a top part of the tank to collect natural gas that has evaporated in the tank.

9. The system as claimed in claim 5, wherein the circuit portion common to the first and to the second circuit is limited downstream by a switchable three way connection member allowing the circuit portion in common to be connected selectively to an inlet of the phase separator or to a portion of the second circuit leading to the burner.

10. The system as claimed in claim 5, wherein the second circuit for feeding the burner is fitted with a gas heating appliance.

11. The system as claimed in claim 5, wherein the first circuit for supplying natural gas to the apparatus for generating power comprises a compressor positioned downstream of the phase separator.

12. The system as claimed in claim 5, further comprising a device for monitoring a variable indicative of a methane number of the first stream of natural gas.

13. The system as claimed in claim 12, wherein the device for monitoring a variable indicative of the methane number of the first stream of natural gas comprises a sensor for measuring at least one of a flow rate in the supply conduit leading toward the apparatus for generating power, a sensor for measuring a temperature of evaporated natural gas collected in the tank, a sensor for measuring a level in a condensate collecting container, and a counter for measuring the purge frequency of a condensate collection container.

14. The system as claimed in claim 12, wherein the device for monitoring a variable indicative of the methane number of the first stream of natural gas is designed to activate at least one of an alarm signal, and a switchable three-way connection member so as to feed the second stream of natural gas toward the burner when the variable indicative of the methane number of the first stream of natural gas crosses a threshold.

15. A ship comprising a liquefied gas storage tank, an apparatus for generating power, a burner of an installation for generating power and a system for treating and feeding the natural gas, the system comprising:
a first supply circuit feeding the apparatus for generating power, said first circuit comprising a phase separator arranged to separate a first stream of natural gas into a heavy fraction and a light fraction, each fraction containing hydrocarbons that have carbon chains, the carbon chains of the heavy fraction being longer than the carbon chains of the light fraction; the phase separator connected, downstream to a return conduit allowing the heavy fraction to be returned to the tank in the form of condensate and, to a supply conduit feeding the light fraction to the apparatus for generating power
a second supply circuit feeding the burner arranged to feed a second stream of natural gas from the tank to the burner, the second circuit bypassing the phase separator.

16. The ship as claimed in claim 15, wherein the apparatus for generating power is intended for the propulsion of the ship.

17. The ship as claimed in claim 15, wherein the liquefied gas storage tank is a tank with a membrane.

18. The ship as claimed in claim 15, wherein the liquefied gas storage tank is a storage tank at atmospheric pressure.

19. A method for filling the liquefied gas storage tank of the ship as claimed in claim 15, wherein the method comprises the step of feeding a fluid through insulated pipelines from a floating or on shore storage facility to the liquefied gas storage tank of the ship.

20. A fluid transfer system, the system comprising the ship as claimed in claim 15, insulated pipelines arranged in such a way as to connect the liquefied gas storage tank which is installed in a hull of the ship to a floating or on shore storage facility and a pump for driving a stream of fluid through the insulated pipelines from the floating or on shore storage facility to the tank of the ship.

* * * * *